United States Patent [19]

Fallon et al.

[11] Patent Number: 4,481,969

[45] Date of Patent: Nov. 13, 1984

[54] FLUID PRESSURE CONTROL DEVICE

[75] Inventors: Merton R. Fallon, Thousand Oaks, Calif.; Thomas W. Clements, Ambler, Pa.

[73] Assignee: Draft Systems, Inc., Northridge, Calif.

[21] Appl. No.: 501,432

[22] Filed: Jun. 6, 1983

[51] Int. Cl.³ .................................................. G05D 16/06
[52] U.S. Cl. .............................. 137/116.5; 137/505.25
[58] Field of Search .................... 137/305.25, 102, 107, 137/116.5

[56] References Cited

U.S. PATENT DOCUMENTS 3,042,061  7/1962  Dobrikin ............................ 137/102
3,411,523 11/1968  Lapera ............................ 137/116.5
3,834,837  9/1974  Nickell ............................ 137/102
3,848,631 11/1974  Fallon ............................ 137/505.11

Primary Examiner—Martin P. Schwadron
Assistant Examiner—James R. Shay

Attorney, Agent, or Firm—James E. Brunton

[57] ABSTRACT

The safety device is disposable in the gas line connecting between a gas source under pressure and a tapping device installed in a keg. The safety device includes a valve housing carrying a spring biased, axially movable piston assembly including a valve body and an axially movable stem element. Upon an increase in gas line pressure above a predetermined pressure, the gas acts on the piston assembly to displace it as a unit in an upstream direction against the bias of the spring to seal the stem against a primary valve seat element and preclude further ingress of gas into the keg. However, should the primary valve seat element leak, due to wear or contamination, causing pressure within the system to increase, the valve body will move relative to the valve stem to vent the housing to atmosphere and to close a secondary valve seat adapted to positively prevent further fluid flow downstream of the device toward the keg.

8 Claims, 2 Drawing Figures

FLUID PRESSURE CONTROL DEVICE

BACKGROUND OF THE INVENTION

1. Field of the Invention

The present invention relates generally to protective devices for beverage dispensing systems, particularly those systems for drawing liquids, such as beer, from containers, such as beer kegs or barrels, using a gas to drive the liquid from the container. More particularly the present invention relates to a novel protective device including redundant safety relief valves for precluding ingress of gas above a predetermined pressure into the keg and regulating the gas pressure within the keg to maintain a predetermined keg pressure thereby to maintain the quality of the beer issued from the keg.

2. Discussion of the Prior Art

Failure of a fluid pressurization system in a keg or like container tapping system can result in large surges of highly pressurized gas flowing through the tapping system into the keg. Keg overpressurization beyond safe limits can and has in the past resulted in the explosion of the keg causing serious injuries and even fatalities. Overpressurization also causes the kegs, due to their peculiar shape, to elongate thus making complete withdrawal of the beer from the keg virtually impossible utilizing existing tapping equipment.

Because of the variety of keg or container sizes, designs, materials of construction, histories of use and abuse, states of structural fatigue, a precise maximum safe internal pressure has been difficult to determine. Also, the degree of hazard associated with a structural failure of the keg or container varies with the degree to which the liquid has already been drawn from the keg, i.e., the quantity of remaining gas volume. An internal pressure of 60 psi gauge is generally considered the maximum safe upper limit. However, when high gas pressures obtain in the keg, albeit within the safe limit of 60 psi gauge, overcarbonization of the beer may occur resulting in a change in the taste of the beer. Surges of gas pressure into the keg thus deleteriously affect the quality of the beer withdrawn from the keg.

There are two sources of keg pressurization, (1) internally generated pressure resulting from the evolution of CO2 gas normally dissolved in the beer, and (2) the gas pressure supplied through the tapping system from an external source. The first is not considered as a source of keg overpressurization sufficient to explode the keg as extreme temperatures, unlikely to occur, would have to be obtained before the maximum safe pressure could be realized. The more common danger of keg explosion as well as reduction in the quality of the beer due to excess pressure, is a result of the use of high pressure air or CO2 bottles as the gas pressurization source.

It has been found that excessive pressures in systems utilizing the CO2 bottle are caused by (a) mechanical failure of the pressure regulator to shut off completely when a predetermined pressure is obtained, and (b) full open mechanical failure of the regulator which usually results from structural failure of the pressure diaphragm. Excessive pressure can also be caused by human error in turning the regulator adjustment in the wrong direction or by inverting the CO2 bottle. In regulators, prevalent cause of failure is contamination resulting from beer backed up into the gas feed line during tapping. Thus, in those systems wherein the beer has backed up, the beer contaminates and corrodes the valve often times in a manner precluding full shutoff.

Full open failure of the regulator has also occurred. An appreciation of the consequences of such a faiure can be obtained by noting that a conventional and commonly employed CO2 bottle in tapping beer kegs and the like is capable of dumping its full capacity of gas under pressure, for example, in certain instances about 900 psi gauge into a keg in less than 1 second. It has been found in actual tests that a half-barrel keg in poor condition and 90% full would rupture under the foregoing conditions approximately 0.9 seconds after failure of the regulator and that the same keg 10% full would rupture in approximately 8 seconds.

Pressure relief devices have been provided in tapping units in the past purportedly for the purpose of dumping the excess gas, when a failure occurs, before the maximum safe pressure of the keg is exceeded. For example, a pressure relief valve has been provided in the coupler of the tapping assembly described and illustrated in U.S. Pat. No. 3,288,413. However, it has been found, after stringent examination of this type of valve and its operation, that overpressurization of the keg beyond the maximum safe keg pressure is, in fact, not prevented. The relief valve has been found to be ineffective as (1) its orifice is simply not large enough to dump the pressure quickly enough to preclude overpressurization of the keg beyond the maximum safe pressure, (2) the spring which biases the valve structure into a closed position actually decreases the orifice size in response to increasing pressure due to the closing of the coils, and (3) the pressure at which the relief valve opens changes due to setting of the O-ring seal over the course of use of the coupler. As a result, this pressure relief valve has been found to be unsatisfactory.

One of the most successful beer keg safety systems ever devised is that described and claimed in U.S. Pat. No. 3,848,631 issued to the present inventors. However, the invention as described herein constitutes a substantial improvement over the device described in this earlier issued patent.

As will be more fully discussed in the paragraphs which follow, the present invention significantly improves the safety features of the earlier patented device and provides a novel and improved system for beverage dispensing, particularly beer dispensing systems which overcomes or minimizes the previous problems associated with prior beer tapping systems. More particularly the present invention provides a protective device which includes a secondary safety pressure relieving assembly and (a) positively precludes overpressurization of the keg and keg explosion even if the primary seat of the device should leak or fail; (2) precludes diminution of the quality of the beer withdrawn from the keg by maintaining a predetermined normal tapping pressure in the keg; and (3) automatically regulates and maintains the normal keg tapping pressure irrespective of the pressure of the gas supplied to the keg.

SUMMARY OF THE INVENTION

It is a primary object of the present invention to provide an improved protective device for beer kegs or the like for preventing overpressurization of the keg.

It is another object of the present invention to provide a device of the aforementioned character including a valve operable to regulate the pressure within the keg to a predetermined normal tapping pressure irrespective of higher pressures in the gas supply line.

It is another object of the present invention to provide a protective device for beer kegs and the like wherein a predetermined tapping pressure is maintained in the keg whereby diminution of the quality of the beer due to even light overpressurization of the keg is prevented.

It is still another object of the present invention to provide a safety valve for beer kegs and the like including primary and secondary pressure relief assemblies so that in the event of leakage of the primary assembly the cooperating secondary assembly will positively prevent catastrophic failure due to overpressurization of the beverage container to which the system is interconnected.

It is a further object of the present invention to provide a safety valve for beer kegs and the like for venting the gas supply line to atmosphere in response to a predetermined pressure.

It is still a further object of the present invention to provide a safety valve for beer kegs and the like which is reliable, efficient and repeatable in operation at precise predetermined pressures.

It is a related object of the present invention to provide a protective device for beer kegs and the like for use with current keg tapping devices.

DESCRIPTION OF ONE FORM OF THE INVENTION

Figure 1:
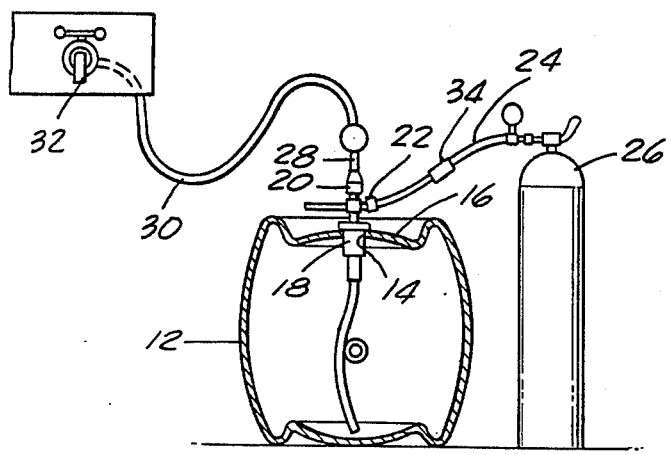
FIG. 1 is a schematic view illustrating a beer tapping apparatus including a gas source, a keg and a faucet and further illustrating the disposition of a protective device constructed in accordance with the present invention in the gas supply line between the gas source and keg.

Referring now to the drawings and particularly to FIG. 1, there is schematically illustrated a conventional beer keg 12 having an opening 14 in its top wall 16 in which opening there is received a keg adapter 18, the adapter being semipermanently installed in the keg 12. A coupler unit 20 is connected to keg adapter 18 to form a keg tapping device. The keg tapping device may comprise the keg adapter and tapping unit as illustrated in U.S. Pat. No. 3,422,448 of common assignee herewith or may comprise other conventional tapping device, the safety valve hereof being capable of use with virtually any type of tapping device. Coupler 20 has a gas inlet port 22 having a fitting adapted to receive the end of a gas supply line 24, the opposite end of which communicates with a gas supply source 26, a CO2 bottle being here shown. Coupler 20 also has a beer exit fitting 28 which is adapted to receive an end of a flexible beer line 30 through which beer is conducted from the keg through the tapping device to a cnventional faucet 32. The arrangement of FIG. 1 is illustrated merely for the purpose of showing the environment of the present invention. The components thereof including the keg, tapping device, gas supply source, and faucet are conventional and do not comprise a part of the present invention and further description thereof is believed unnecessary. It is sufficient for present purposes to note that the safety valve, generally indicated 34, is disposed in the gas supply line 24 as desired or, in later described forms hereof, may be provided as a portion of the coupler of the tapping device or at the regulator of the gas source as hereinafter amplified. It will be appreciated that, in the arrangement shown, gas is supplied from source 26 through gas supply line 24 and through the tapping device comprising coupler 20 and keg adapter 18 into the keg. The gas in the keg then drives the beer outwardly through the tapping device and beer supply line 30 for dispensing at faucet 32.

Figure 2:
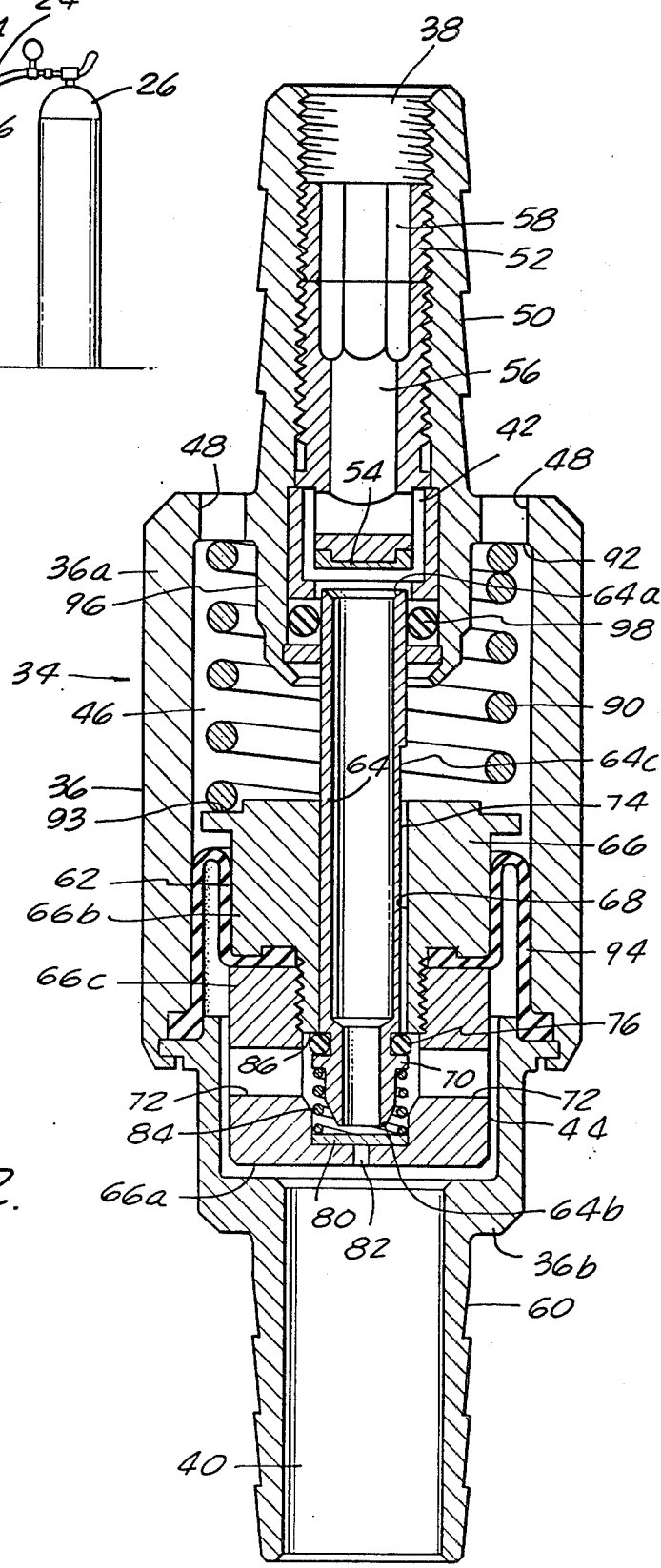
FIG. 2 is an enlarged longitudinal cross-sectional view of the valve illustrated in FIG. 1.

Referring now to FIG. 2, the fluid pressure control device of the present invention includes a housing 36 having a fluid inlet 38 and a fluid outlet 40. Defined internally of housing 36 there is a first chamber 42 in communication with fluid inlet 38, a second chamber 44 in communication with fluid outlet 40, and a third chamber 46 in communication with atmosphere through apertures 48 provided in housing 36.

Valve housing 36 also includes an inlet fitting 50 which is internally threaded to threadably receive a valve element 52 which is axially adjustable within the housing. Valve element 52 includes a first elastomeric valve seat 54 which is disposed within first chamber 42 and also includes a fluid passageway 56 interconnecting the fluid inlet of the device with first chamber 42. Element 52 is provided with an opening in its outer end in the form of an enlarged hex socket portion 58 which comprises the wrench engaging means of the invention for engagement by a hex wrench to axially adjust the element within the housing so as to precisely the position valve seat 54 within chamber 42.

Housing 36 also includes an outlet fitting 60 through which is formed the fluid outlet 40. Both the inlet and outlet fittings 50 and 60 are provided with external axially shaped shoulders and tapered portions adapting the fittings for interconnection with the usual type of rubber or plastic tubing used to construct the gas supply line 24.

Disposed interiorly of housing 36 is a piston assembly generally designated by the numeral 62. Piston assembly 62 is adapted for axial movement within housing 36 between first and second positions and comprises an elongated generally tubular shaped stem member 64 and a piston body 66 having an axial bore 68 which is adapted to telescopically receive stem member 64. Stem member 64 includes an annular shaped first end 64a which is disposed within first chamber 42 in close proximity with the elastomeric valve seat 54. Additionally, stem member 64 has an annular shaped second or lower end 64b which is normally in communication with second chamber 44. Formed proximate second end 64b is a radially extending flange portion 70, the purpose of which will presently be described.

Piston body 66 is provided with diametrically opposed radially extending fluid passageways 72 which interconnect the axial bore 68 of the body with second chamber 44. Formed between piston body 66 and stem member 64 is a second fluid passageway 74 which functions to interconnect second chamber 44 with third chamber 46 when the piston body is moved relative to stem member 64 from a first position as shown in FIG. 2 into a second elevated position. In the embodiment of the invention shown in the drawings, passageway 74 is formed by grinding a flat 64c along a substantial portion of one side of stem 64. The important purpose of passageway 74 will be described in the paragraphs which follow.

When the piston body 66 is in its first position as shown in FIG. 2, a closure means is provided for closing the lower end of second passageway 74 so as to prevent the flow of fluid between chambers 44 and 46. This closure means, which in the present embodiment of the invention is provided in the form of an elastomeric O-ring 76, forms a part of the unique secondary pressure relief system of the device of the present invention.

Disposed within the lower portion of the axial bore 68 is a second elastomeric valve seat 80 which also forms a part of the secondary pressure relief system of the device. Valve seat 80 is positioned above and normally closes a small bore 82 formed in the lower end of the valve body 66 which provides for equalization of pressure between chambers 44 the undersurface of valve seat 80.

A first biasing means in the form of a coiled spring 84 is receivable over the lower extremity of the valve stem member 64 and is positioned within axial bore 68 so that its lower end engages elastomeric valve seat 80 and its upper end engages the previously identified flange 70. This biasing means functions to yieldably resist relative movement between the piston body 66 and the stem member 64. Stated another way, spring 84 functions to cause the piston body and tubular member 64 to normally move as a single assembly. For example, if fluid under pressure within chamber 44 acts against the lower face 66a of the piston body with sufficient force to tend to move the piston body upwardly within the valve housing, spring 84 functions to urge valve tube 66 to simultaneously move upwardly along with the valve body.

A second biasing means in the form of a heavier coil spring 90 yieldably resists movement of the piston assembly from the first position shown in FIG. 2 to a second elevated position when the fluid pressure within chamber 44 remains below a predetermined level. However, when the fluid pressure exceeds this predetermined level, the force of the fluid acting on face 66a of the piston body will overcome the urging of spring 90 and will force the piston assembly to move upwardly toward the second elevated position. As indicated in FIG. 2, housing 36 includes an enlarged diameter upper portion which defines an internal shoulder 92 against which the upper end of coil spring 90 rests. The lower end of the spring 92 is held captive within the valve housing and engages an annular shaped groove 93 formed proximate the upper portion of piston body 66. With this construction spring 92 tends to yieldably resist upward movement of piston body 66 within the valve housing.

A first sealing means is carried interiorly of housing 36 for preventing fluid flow between second chamber 44 and third chamber 46 when the piston assembly is in a first position as shown in FIG. 2. In the embodiment of the invention hereshown, this first sealing means is provided in the form of a yieldably deformable diaphragm 94.

A second sealing means is disposed between stem member 64 and the inner surface of a downwardly projecting cylindrical portion 96 which comprises an integral part of housing 36. In the embodiment of the invention shown in the drawings, this second sealing means is provided in the form of an elastomeric O-ring 98.

As indicated in FIG. 2, housing 36 is provided in the form of interconnected upper and lower portions 36a and 36b respectively. Similarly, piston body 66 is provided in the form of upper and lower threadably interconnected portions 66b and 66c respectively. With this arrangement, the inner peripheral portion of diaphragm 94 is clamped between the upper and lower portions of the piston body and the outer peripheral portion of the diaphragm is clamped between the upper and lower portions of the housing 36. The diaphragm is constructed of a yieldably deformable material so that the diaphragm will prevent the flow of fluid between chambers 44 and 46, but will permit limited axial movement of the piston assembly within the housing 36.

Operation

To clarify the operation of the device of the present invention, and to emphasize the importance of the secondary pressure relief aspect of the apparatus, a brief review of the failure mode of pressure relief devices of the type shown in Pat. No. 3,848,631 is in order. Failure of pressure regulators of the general type disclosed in the aforementioned patent usually result because of contamination and/or deterioration of the primary valve seat (see element 64 in the '631 patent) to an extent that leak-tight shut off of fluid flowing into the device becomes impossible. In such case, with no fluid flow being demanded downstream of the pressure control device, leakage of the primary valve seat causes the downstream, or output pressure, to in time build to the level of the inlet pressure. This condition can be extremely dangerous in many types of pressurized systems and is particularly hazardous in closed systems of the type found in the beverage industry as shown in FIG. 1 of the drawings.

In systems of the type shown in the '631 patent, as the primary valve seat continues to leak, the pressure operating upwardly on the valve piston increases to a point that the downward force exerted by the output spring is overcome. This, of course, operates to cause the primary control valve to attempt to close against the primary seat with an ever increasing degree of force in an effort to halt the seal leakage. However, where the seat is deteriorated, or where contaminants are present, even this greater force being exerted to close the valve cannot prevent the continued flow of fluid under pressure into the system. With time, this continued fluid flow into the closed pressure system can result in catastrophic failure.

The unique design of the device of the present invention positively precludes catastrophic failure even if serious fluid leakage past the primary valve seat develops and subsists. Referring to FIG. 2, in operation of the device of the present invention fluid will flow through the inlet of the device into first chamber 42, then downwardly through the interior of stem member 64, outwardly through openings 72 leading to chamber 44 and finally outwardly of the device through fluid outlet 40. However, should the pressure within chamber 44 exceed a predetermined amount, the fluid pressure acting against the piston assembly will overcome the downward urging of spring 90 allowing the piston assembly to move upwardly until the upper end 64a of the tubular valve stem is in pressural engagement with first seat 54. Note that because of spring 84 acting against flange member 72, the stem member 64 and the valve body 66 will move upwardly as a unit.

Assuming that there is no leakage around valve seat 54, the flow of fluid into the device will cease until the pressure on the downstream side of the device is such as to permit spring 90 to move the valve assembly downwardly thereby opening the fluid flow path through chamber 42. However, in the condition wherein there is no downstream demand for fluid flow and where a leakage develops around seat 54, the pressure within chamber 44 will continue to build and the fluid under pressure will continue to urge the piston assembly in an upwardly direction. Such is also the case in the operation of the device of the '631 patent. However, in the device of the present invention, as this pressure increases sufficiently to cause compression of both spring 90 and spring 84, the piston body 66 will move from the first position shown in FIG. 2 upwardly relative to stem member 64 to a second position wherein passageway 68 will be open to communicate with chamber 44. Continued movement of the valve body upwardly to a third position will cause valve seat 80 to move into engagement with the lower end of stem member 64. This occurs because at the initial level of fluid pressure which is sufficient to compress spring 90, the upper end of stem member 64 is moved into pressural engagement with seat 54 thus preventing any further upward movement of the stem member. However, because the piston body is free to move relative to the stem member, increased pressure on the piston body sufficient to overcome the urging of spring 84 will cause the piston body to move upwardly relative to the stem member. This opens chamber 44 to atmosphere permitting the instantaneous venting to atmosphere of the fluid within chamber 44. Additionally, continued upward movement of the piston body brings second valve seat 80 into pressural engagement with the lower end 64b of the stem member 64 thereby preventing any further flow of fluid into chamber 44 and thence downstream of the device through outlet 40. This action of the secondary relief system of the device positively prevents pressure buildup downstream of the device, as for example in a beer keg or other beverage container of the character shown in FIG. 1 of the drawings.

By way of further clarification of this important aspect of the invention, assume that the device of the invention is adjusted for an output pressure of 14 pounds per square inch (psi) and is operating normally. Further assume that springs 84 and 90 are selected so that a fluid pressure acting upon the piston body of about 6 psi over normal output pressure is sufficient to overcome the combined forces of the springs. Now, if for some reason, primary seat leakage begins to occur on a small scale (commonly called regulator creep), and there is no downstream demand for fluid, at approximately 20 psi the valve body 66 will move upwardly so as to open passageway 74 to permit the fluid flow resulting from the primary seat leakage to be exhausted to atmosphere. In this condition the device is in balance at an output pressure of 20 psi with a continuous leakage of fluid to atsmophere from chamber 44 through second passageway 74.

If the primary seat leakage continues to increase in magnitude to the point where the relieving capacity of the vent system becomes saturated (i.e. to the maximum capacity of passageway 74), the output pressure will have increased to approximately 24 psi. At this point, the valve body 66 will have moved upwardly relative to the stem member to a third position wherein the lower end of the stem member is in pressural engagement with second seat 80 and further fluid flow downstream of the device is positively precluded.

The secondary safety relief feature of the present invention as herein described constitutes a significant improvement in the safeguarding of pressurized systems from being exposed to dangerously high and destructive pressures. Although the events have been described herein as occurring sequentially over a period of time, the secondary safety relief apparatus is capable of acting instantaneously to prevent catastrophic failure even in the case of a wide open high pressure condition at the fluid inlet and primary valve seat of the device.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A fluid pressure control device comprising:
   (a) a housing having a fluid inlet and a fluid outlet and including a first internal chamber in communication with said fluid inlet, a second internal chamber in communication with said fluid outlet, and a third internal chamber in communication with atmosphere;
   (b) a first valve seat carried by said housing and disposed within said first chamber;
   (c) a piston assembly disposed interiorly of said housing for axial movement therewithin between first and second positions, said piston assembly comprising:
      (1) a piston body having an axial bore extending partially therethrough, an upper face, a lower face, and at least one fluid passageway interconnecting said axial bore and said second chamber;
      (2) a second valve seat disposed within said axial bore proximate the lower end thereof;
      (3) a tubular shaped stem member telescopically receivable within said axial bore of said piston body, said stem having a first end disposed in said first chamber and a second end disposed in close proximity with said second valve seat, said first end being movable into pressural engagement with said first valve seat when said piston assembly is moved from said first to said second position, and said second end being movable into pressural engagement with said second valve seat upon a predetermined degree of relative movement between said piston body and said stem; and
      (4) first biasing beans for yieldably resisting relative movement between said piston body and said stem;
   (d) first sealing means carried interiorly of said housing for preventing fluid flow between said second and third chambers when said piston assembly is in a first position;
   (e) second sealing means disposed between said stem and said housing for preventing fluid flow between said first and third chambers; and
   (f) second biasing means carried internally of said housing for yieldably resisting movement of said piston assembly from said first position to said second position when the fluid pressure within said second chamber is below a predetermined level.

2. A fluid pressure control device as defined in claim 1 in which said piston assembly is provided with a fluid passageway interconnecting said second chamber and said third chamber and comprises closure means for closing said fluid passageway when said piston body is in a first position relative to said stem and for opening said fluid passageway when said piston body is in a second position relative to said stem.

3. A fluid pressure control device as defined in claim 1 in which said housing includes upper and lower interconnected portions, in which said piston body includes upper and lower interconnected portions and in which said first sealing means comprises a diaphragm, the inner peripheral portion of which is clamped between said upper and lower portions of said piston body and the outer peripheral portion of which is clamped between said upper and lower portions of said housing.

4. A fluid pressure control device as defined in claim 3 in which said upper portion of said housing includes an enlarged diameter portion defining an internal shoulder and in which said second biasing means comprises an elongated coil spring the upper end of which engages said internal shoulder and the lower portion of which engages said piston body.

5. A fluid pressure control device as defined in claim 3 in which said stem includes a radially extending flange portion disposed proximate said second end thereof and in which said first biasing means comprises an elongated coil spring the upper end of which engages said flange portion and the lower end of which engages said second valve seat.

6. A fluid pressure control device comprising:
(a) a housing having a fluid inlet and a fluid outlet and defining internally thereof first chamber in communication with said fluid inlet, a second chamber in communication with said fluid outlet, and a third internal chamber in communication with atmosphere;
(b) a valve element mounted within said housing said element having a first valve seat disposed within said first chamber and a fluid passageway interconnecting said fluid inlet with said first chamber;
(c) a piston assembly disposed interiorly of said housing for axial movement therewithin between first and second positions, said pistion assembly comprising:
  (1) an elongated generally tubular shaped stem member having a first end disposed in said first chamber in close proximity with said first valve seat and a second end normally in communication with said second chamber;
  (2) a piston body having an axial bore adapted to telescopically receive said stem member, said piston body also having at least one first fluid passageway interconnecting said second chamber and said axial bore, and said piston body in cooperation with said stem member defining at least one second fluid passageway interconnecting said second chamber and said third chamber, said piston body being movable relative to said stem member from a first position to a second position;
  (3) closure means for closing said second passageway when said piston body is in said first position;
  (4) a second valve seat carried by said piston body in a spaced apart relationship with second end of said stem member when said piston body is in said first position; and
  (5) first biasing means for yieldably resisting relative movement between said piston body and said stem member;
(d) a yieldably deformable diaphragm carried interiorly of said housing and separating said second and third chambers to prevent fluid flow therebetween when said piston assembly is in a first position;
(e) second sealing means disposed between said stem and said housing for preventing fluid flow between said first and third chambers; and
(f) second biasing means carried internally of said housing for yieldably resisting movement of said piston assembly from said first position to said second position when the fluid pressure within said second chamber is below a predetermined level.

7. A fluid pressure control device as defined in claim 6 in which said valve element is threadably interconnected with said housing and includes wrench engaging means for engagement by a wrench inserted into said fluid inlet portion of said housing for adjustment of the spacing between said first valve seat and said first end of said stem member.

8. A fluid pressure control device as defined in claim 6 in which said second passageway is opened to interconnect said second chamber with atmosphere upon movement of said piston body relative to said stem member toward said second position and in which when said piston body is moved into said second position, said second valve seat is moved into pressural engagement with said second end of said stem member.

* * * * *